(12) United States Patent
Lewis

(10) Patent No.: US 9,564,847 B2
(45) Date of Patent: Feb. 7, 2017

(54) ELECTRICAL MACHINES

(75) Inventor: Eric Anthony Lewis, Warwickshire (GB)

(73) Assignee: GE Energy Power Conversion Technology LTD. (GB)

(*) Notice: Subject to any disclaimer, the term of this patent is extended or adjusted under 35 U.S.C. 154(b) by 395 days.

(21) Appl. No.: 13/634,929

(22) PCT Filed: Mar. 15, 2011

(86) PCT No.: PCT/EP2011/001272
§ 371 (c)(1),
(2), (4) Date: Jan. 2, 2013

(87) PCT Pub. No.: WO2011/113577
PCT Pub. Date: Sep. 22, 2011

(65) Prior Publication Data
US 2013/0127391 A1 May 23, 2013

(30) Foreign Application Priority Data
Mar. 17, 2010 (EP) .................................... 10002803

(51) Int. Cl.
*H02P 25/18* (2006.01)
*H02K 1/00* (2006.01)
*H02K 3/28* (2006.01)

(52) U.S. Cl.
CPC .............. *H02P 25/18* (2013.01); *H02K 3/28* (2013.01)

(58) Field of Classification Search
CPC .............. H02K 3/28; H02K 3/12; H02K 3/26; H02K 3/18; H02K 1/165; H02K 29/00; H02K 29/03; H02K 3/04; H02K 23/30; H02K 3/32; H02K 17/08; H02K 23/26; B60R 16/03; H02J 7/0065; H02P 25/04; H02P 1/44; H02M 7/1626
(Continued)

(56) References Cited

U.S. PATENT DOCUMENTS 1,970,914 A * 8/1934 Kilbourne .............. H02K 17/12
318/724
3,450,971 A * 6/1969 Fong et al. ................... 318/704
(Continued)

FOREIGN PATENT DOCUMENTS

AU 1961003013 * 3/1963
DE 102007040725 A1 * 3/2009
(Continued)

OTHER PUBLICATIONS

Machine Translation for DE 102007040725 A1.*

*Primary Examiner* — Terrance Kenerly
*Assistant Examiner* — Ahmed Elnakib
(74) *Attorney, Agent, or Firm* — WOOD IP LLC

(57) ABSTRACT

An ac synchronous electrical machine includes a stator and a multi-phase stator winding that defines a plurality of stator poles. The stator winding has two or more coil groups, each coil group including a plurality of coils for each phase that are received in winding slots in the stator. The stator winding is connected to a power source/sink. The coil groups are connected in series and each coil group is connected to a power source/sink by a respective switch (26a, 26b . . . ). This allows one or more of the coil groups to be selectively supplied with power from the associated power source/sink or selectively supply power to the associated power source/sink. The switches are operated by a controller. The coils in each coil group are arranged substantially symmetrically around the circumference of the stator to define selected poles of the electrical machine and to produce a constant and balanced rotating torque when any particular coil group or combination of coil groups is active.

11 Claims, 9 Drawing Sheets

(58) Field of Classification Search
USPC ............... 310/180, 184, 198, 200, 179,
216.005,310/12.22, 132, 134, 140, 141,
142, 144, 146,310/149; 318/498, 767,
768, 771, 772, 775, 318/776, 777, 779,
122, 400.41, 704, 716, 720, 318/724, 748,
753, 754, 778, 785, 290, 496, 318/502,
572, 126, 524
See application file for complete search history.

(56) References Cited

U.S. PATENT DOCUMENTS

| | | | | |
|---|---|---|---|---|
| 3,596,161 A | * | 7/1971 | Swanke et al. | 388/827 |
| 3,761,752 A | * | 9/1973 | Anderson | H02K 3/00 |
| | | | | 310/179 |
| 4,481,455 A | * | 11/1984 | Sugimoto et al. | 318/778 |
| 4,675,591 A | * | 6/1987 | Pleiss | 318/773 |
| 5,134,332 A | * | 7/1992 | Nakamura et al. | 310/208 |
| 5,177,423 A | * | 1/1993 | Nakamura et al. | 318/767 |
| 5,418,436 A | | 5/1995 | Apuzzo | |
| 5,442,250 A | * | 8/1995 | Stridsberg | 310/186 |
| 5,736,829 A | * | 4/1998 | Goff | 318/704 |
| 5,760,567 A | * | 6/1998 | Nakamura | H02P 25/20 |
| | | | | 310/184 |
| 5,821,660 A | * | 10/1998 | Anderson | H02K 3/28 |
| | | | | 310/184 |
| 5,917,295 A | * | 6/1999 | Mongeau | 318/400.29 |
| 6,489,701 B1 | * | 12/2002 | Gamble et al. | 310/179 |
| 2007/0035263 A1 | | 2/2007 | Rastogi et al. | |

FOREIGN PATENT DOCUMENTS

| | | | |
|---|---|---|---|
| EP | 1450469 A2 | * | 8/2004 |
| EP | 1808958 | * | 7/2007 |
| EP | 1986310 A1 | | 10/2008 |
| WO | 2008046953 A2 | | 4/2008 |

* cited by examiner

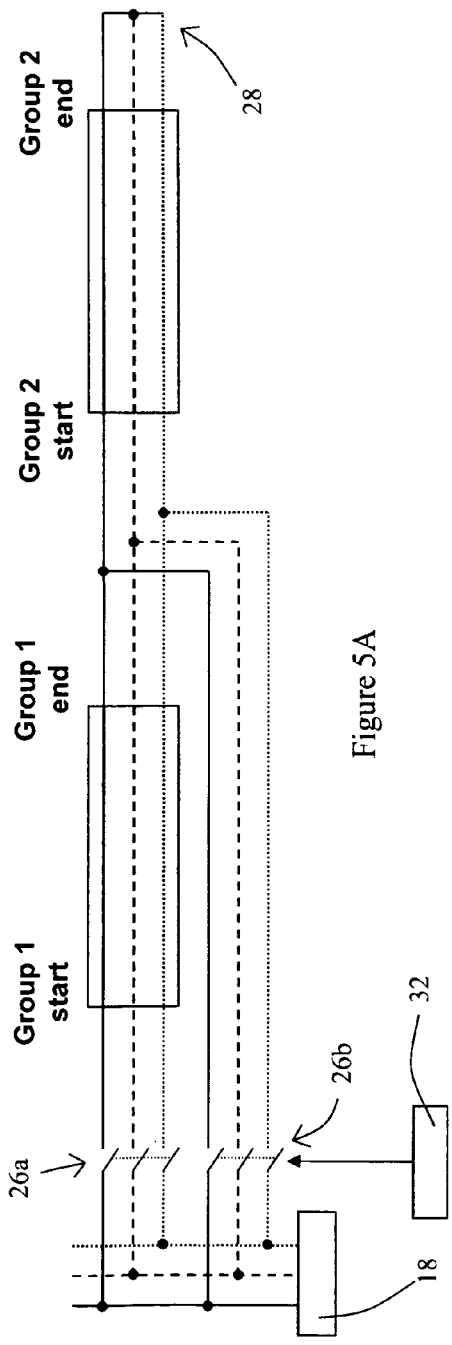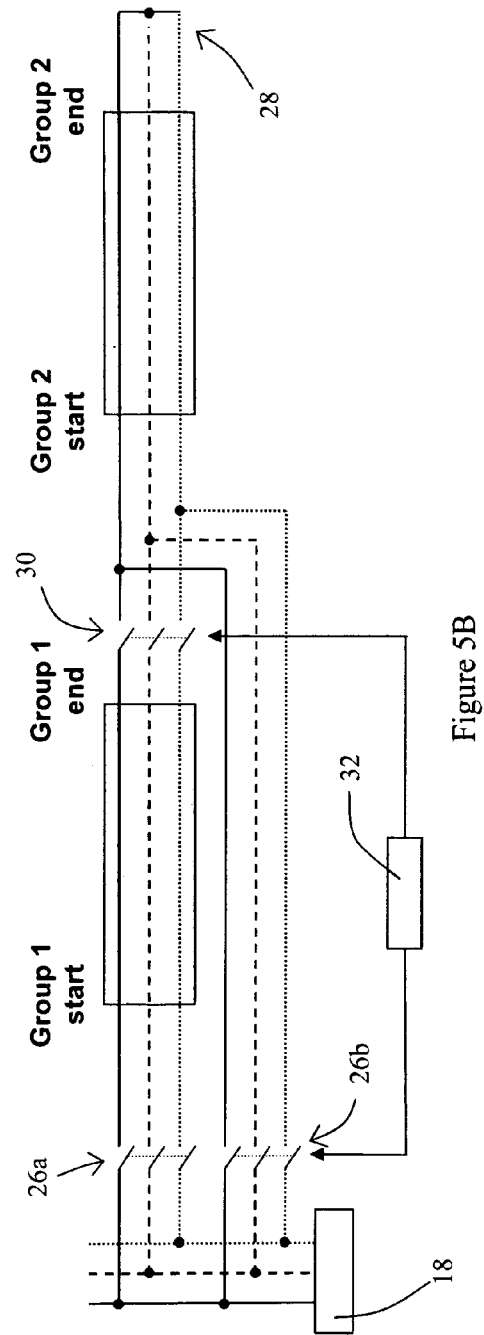
Figure 5A
Figure 5B

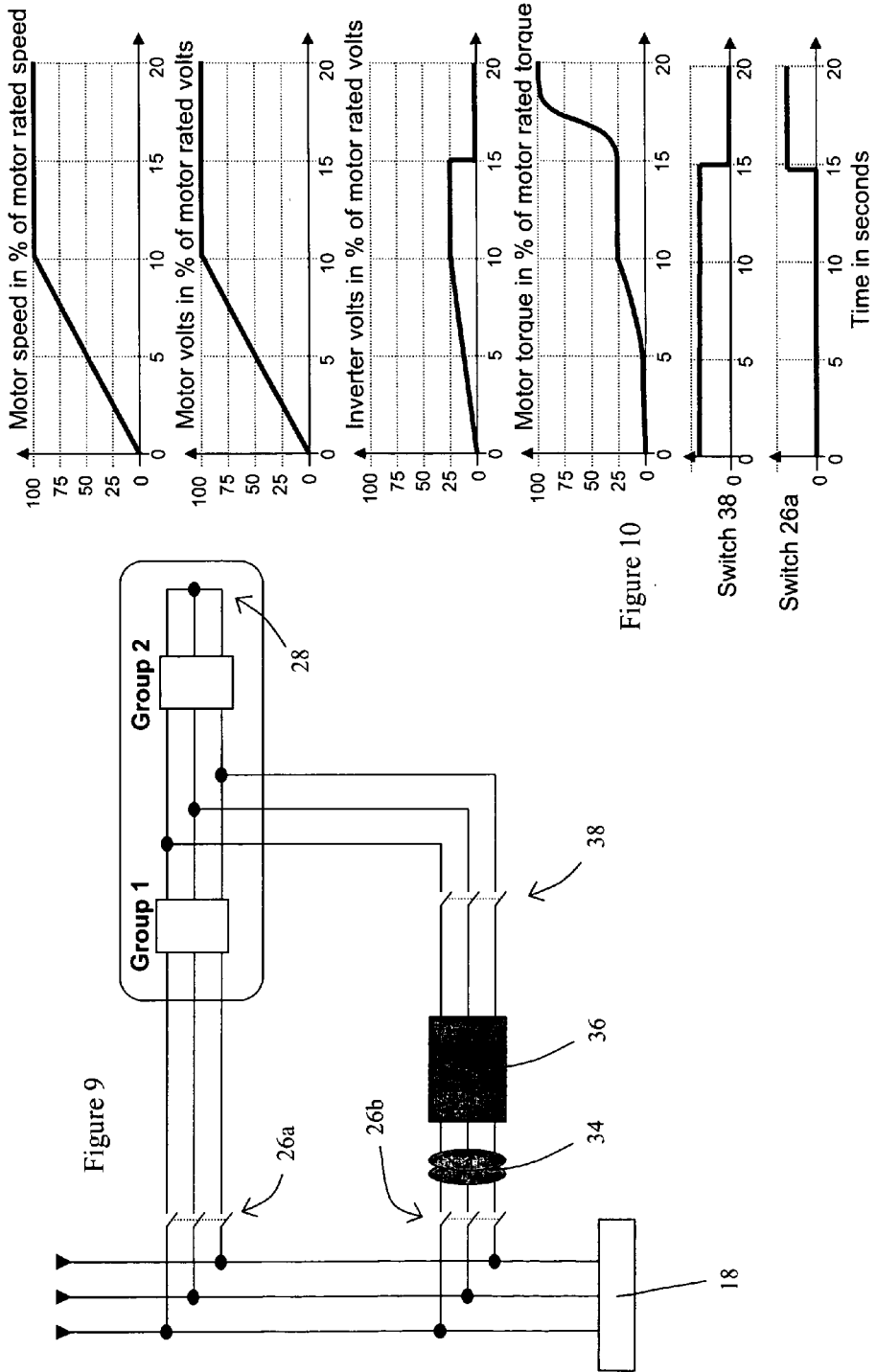

ELECTRICAL MACHINES

FIELD OF THE INVENTION

The present invention relates to electrical machines (e.g. motors and generators), and in particular to permanent magnet electrical machines that are required to operate at essentially constant power over a wide speed range.

BACKGROUND OF THE INVENTION

A typical ac synchronous electrical machine includes a field system mounted on the rotor surrounded by a stator winding mounted on the stator. The stator winding will include a plurality of coils that are located in winding slots formed in a surface of the stator assembly. The rotor provides a rotating magnetic field generated by conventional windings with slip rings or brushless excitation power supply. When operated in a motoring mode, ac power supplied to the stator winding will cause the rotor to rotate and produce shaft torque and mechanical power.

For many applications it is desirable for the electrical machine to increase the speed at a constant power and with no further increase in the stator voltage of the electrical machine. This can be achieved by reducing the rotor flux as the speed increases. A similar field weakening control can be achieved with induction machines.

However, if the rotating field system uses permanent magnets then the rotor flux cannot be reduced in the same way. As the rotor flux remains constant then the stator voltage of the permanent magnet electrical machine will increase as the speed increases. This is not ideal because such a permanent magnet electrical machine will normally need N times the rated insulation voltage and will need a power converter with N times the rated voltage and power of the machine, for an increase of N times the rated speed of the machine.

SUMMARY OF THE INVENTION

The present invention provides an electrical machine (e.g. an ac synchronous motor or generator) comprising: a stator having a plurality of winding slots; and a multi-phase stator winding that defines a plurality of poles of the electrical machine, the stator winding having two or more coil groups, each coil group including a plurality of coils for each phase received in the winding slots, the stator winding being connected to a power source/sink; wherein the coil groups are connected in series and each coil group is connected to a power source/sink by a respective switch so that one or more of the coil groups can be selectively supplied with power from the associated power source/sink or selectively supply power to the associated power source/sink; and wherein the coils in each coil group are arranged substantially symmetrically around the circumference of the stator to define selected poles of the electrical machine to produce a constant and balanced rotating torque when any particular coil group or combination of coil groups is active. In other words, one side or end of each coil group of the stator winding is preferably connected (either directly or by means of a power converter as described below) to an associated power source/sink by means of a suitable switch. The other side or end of each coil group is connected to either an adjacent coil group of the stator winding or a suitable end connection.

The coil groups can be connected in parallel to a common power source/sink or each coil group can be connected to its own separate power source/sink. The latter arrangement may be preferred for an ac machine acceleration circuit where the stator winding includes a first coil group that is connected to a first power source by means of a first switch and a second coil group that is connected in series to the first coil group and to a second power source by means of a second switch and a suitable power converter.

The stator winding allows the electrical machine to operate over a wide speed range at essentially constant voltage to avoid the need for increased machine insulation and increased rating of the power supply/sink that provides power to, or absorbs power from, the electrical machine depending on whether it is operating as a motor or generator, respectively. For example, the electrical machine can be made to operate with only an appropriate proportion of the maximum available machine torque depending on which coil group or combination of coil groups is activated.

The terms 'active' or 'activated' are intended to refer to a situation where a particular coil group is being supplied with power from the associated power source/sink or supplying power to the associated power source/sink. Similarly, the terms 'not active' or 'deactivated' is intended to refer to a situation where a particular coil group is isolated from the associated power source/sink by the associated switch so that it is not being supplied with power from the associated power source/sink or supplying power to the associated power source/sink. A coil group can be activated by closing the switch that connects it to the associated power source/sink and deactivated by opening the switch. The switches may be of any suitable type and may be opened and closed at appropriate times by a controller.

A switch, mechanical link or other suitable selecting mechanism can also be provided between each pair of adjacent connected coil groups. This can help to reduce the required machine insulation for high speed operation.

Each coil can have one or more turns and be of any suitable design.

The coils of the stator winding are normally formed from conventional materials (e.g. copper) since high temperature superconducting (HTS) materials do not operate well with ac currents. Nevertheless, such materials are not excluded from use if circumstances permit.

If the electrical machine includes a rotor winding then this would normally use dc current and the rotor coils can therefore be formed from conventional materials or superconducting (e.g. HTS) materials. The invention is particularly useful for rotors with permanent magnets or with rotor windings where the rotor coils use HTS materials as they cannot normally change their flux rapidly due to the high levels of stored magnetic energy and the electrical machine cannot implement a rapid reduction of stator voltage as its operating speed increases.

The coils are arranged and connected within each coil group to define a series of alternating north and south poles around the surface of the stator. More particularly, the connections to the coils that define each south pole are reversed with respect to those that define each north pole to get the opposite polarity of the magnet flux. Each pole is defined only by the coils of a particular coil group. In other words a particular pole is not defined by a combination of coils from one coil group and coils from another coil group. When a particular coil group or combination of coil groups is active then the coils will define a series of poles that are arranged substantially symmetrically around the circumference of the stator.

Each coil group can include the same number of coils or different numbers of coils. Accordingly, each coil group can provide any proportion of the maximum available torque and provide any proportion of the total number of coils of the stator winding.

Each power source/sink may be a direct connection to an ac power grid or supply network, for example: Each power source/sink may include a power converter such as a variable speed drive system or a power converter with an inverter/rectifier function that can interface the stator winding to a dc supply network, for example.

It will be readily appreciated that the electrical machine should preferably produce a constant rotational torque and rotational power when operating with any particular coil group or combination of coil groups. The electrical machine should preferably not produce lateral torques. The coils in each coil group are therefore located or arranged around the stator assembly of the electrical machine in such a way that a constant and balanced rotating torque is produced with no lateral torques when any particular coil group or combination of coil groups is active. To achieve the desired constant and balanced rotating torque the coils in each coil group are arranged substantially symmetrically about the circumference of the stator. This does not necessarily mean that the coils in each coil group must be evenly distributed about the stator circumference.

The multi-phase stator winding may consist of two or more sub-windings connected together at one end to power source/sink and at the other end to each other by a suitable end connection such as a star or delta connection, for example. One sub-winding will normally be provided for each phase of the electrical machine so that a three-phase stator winding will include three separate sub-windings: one for phase A, one for phase B and one for phase C. Each power source/sink may have any suitable number of phases, but three would be typical.

The electrical machine preferably further includes a rotor carrying a plurality of permanent magnets or a rotor winding. In a commonly used configuration the permanent magnets will be formed on a radially outer surface of the rotor or the rotor winding will be received in winding slots formed in a radially outer surface of the rotor. The coils of the stator winding will be received in winding slots formed in a radially inner surface of the stator. However, other configurations are also possible.

The electrical machine may have a single stator slot per pole per phase design or a several stator slots per pole per phase design.

The coils forming each coil group of the stator winding can be arranged in 'clumps' such that the coils in one coil group define certain stator poles and the coils in another coil group define certain other stator poles. In this case the coils of each coil group are not evenly distributed around the stator circumference and the coil groups do not overlap to any significant degree. Nevertheless, even when arranged in 'clumps' it will be readily appreciated that the coils are still arranged to be substantially symmetrical around the circumference of the stator. Alternatively, if the electrical machine has a several stator slots per pole per phase design, then the coils in one coil group can define all of the stator poles and the coils in another coil group can define all of the stator poles. In this case the coils of each coil group are evenly distributed around the stator circumference and the coil groups overlap. Different torques (i.e. different proportions of the maximum available torque) can be obtained by making each coil group have a different number of coils or have coils with a different number of turns, by dividing the coils in each coil group into discrete 'clumps', by making the coils in each coil group define a different number of selected stator poles, or any combination thereof.

Any convenient number of coils can be fitted in each stator slot.

The present invention provides a method of operating an electrical machine as described above, the method comprising the steps of: selectively operating at least one of the switches to activate or deactivate one or more of the coil groups so that the stator winding has a first rotational torque, and, in response to a change in an operating parameter of the electrical machine, selectively operating at least one of the switches to activate or deactivate one or more of the coil groups so that the stator winding has a second rotational torque that is different to the first rotational torque.

For example, in response to an increase in the operating speed of the electrical machine the rotational torque can be decreased by the appropriate activation and/or deactivation of the coil groups of the stator winding. This results in an operation similar to field weakening and allows the electrical machine to operate over a wide speed range with substantially constant voltage.

The stator winding can also be usefully employed to accelerate the electrical machine up to its rated speed (i.e. the stator winding forms part of an ac machine acceleration circuit). In a conventional arrangement variable voltage and variable frequency can be supplied to the stator winding by a suitable power converter with associated input and output transformers. Once the electrical machine has reached its rated speed then its stator voltage can be controlled by the power converter to be in alignment with an ac supply voltage that is supplied by an ac power grid or supply network, for example, operating at a nominally fixed voltage and nominally fixed frequency. The power source for the stator winding can then be switched from the power converter to the ac power grid or supply network to avoid the losses that arise from operating with the power converter.

The above arrangement requires the use of input and output transformers. If the stator winding is used to accelerate the electrical machine then the use of one of both of these transformers (typically the output transformer) can be avoided.

For an ac machine acceleration circuit the stator winding preferably includes a first coil group and a second coil group connected in series. The first coil group is connected to an associated power source by means of a first switch and the second coil group is connected to an associated power source by means of a second switch and a power converter that provides ac power to the second coil group.

The first and second coil groups can be connected to a common power source. Alternatively, the first coil group is connected to a first power source and the second coil group is connected to a second power source.

An input converter may be provided between the power converter and the second switch.

The present invention further provides a method of accelerating an electrical machine as described above where the first and second coil groups are connected to a common power source, the method comprising the steps of: supplying ac power to the second coil group of the stator winding from the power converter until the electrical machine substantially reaches its rated speed; and supplying ac power to the first and second coil groups of the stator winding from the common power source and operating the electrical machine substantially at its rated speed.

The present invention further provides a method of accelerating an electrical machine as described above where the first coil group is connected to a first power source and the second coil group is connected to a second power source, the method comprising the steps of: supplying ac power to the second coil group of the stator winding from the power converter until the electrical machine substantially reaches its rated speed; and supplying ac power to the first and second coil groups of the stator winding from the first power source and operating the electrical machine substantially at its rated speed.

BRIEF DESCRIPTION OF THE DRAWINGS

Exemplary embodiments of the invention will now be described, with reference to the accompanying drawings, in which:

FIG. 5 is a schematic drawing showing two alternative ways in which the coil groups of the stator winding of FIG. 4 can be connected together;

FIG. 9 is a schematic drawing showing an ac motor acceleration circuit according to the present invention where the stator winding has two coil groups; and FIG. 10 shows the operational parameters of the ac motor acceleration circuit of FIG. 9.

DETAILED DESCRIPTION OF THE PREFERRED EMBODIMENTS

Figure 1:
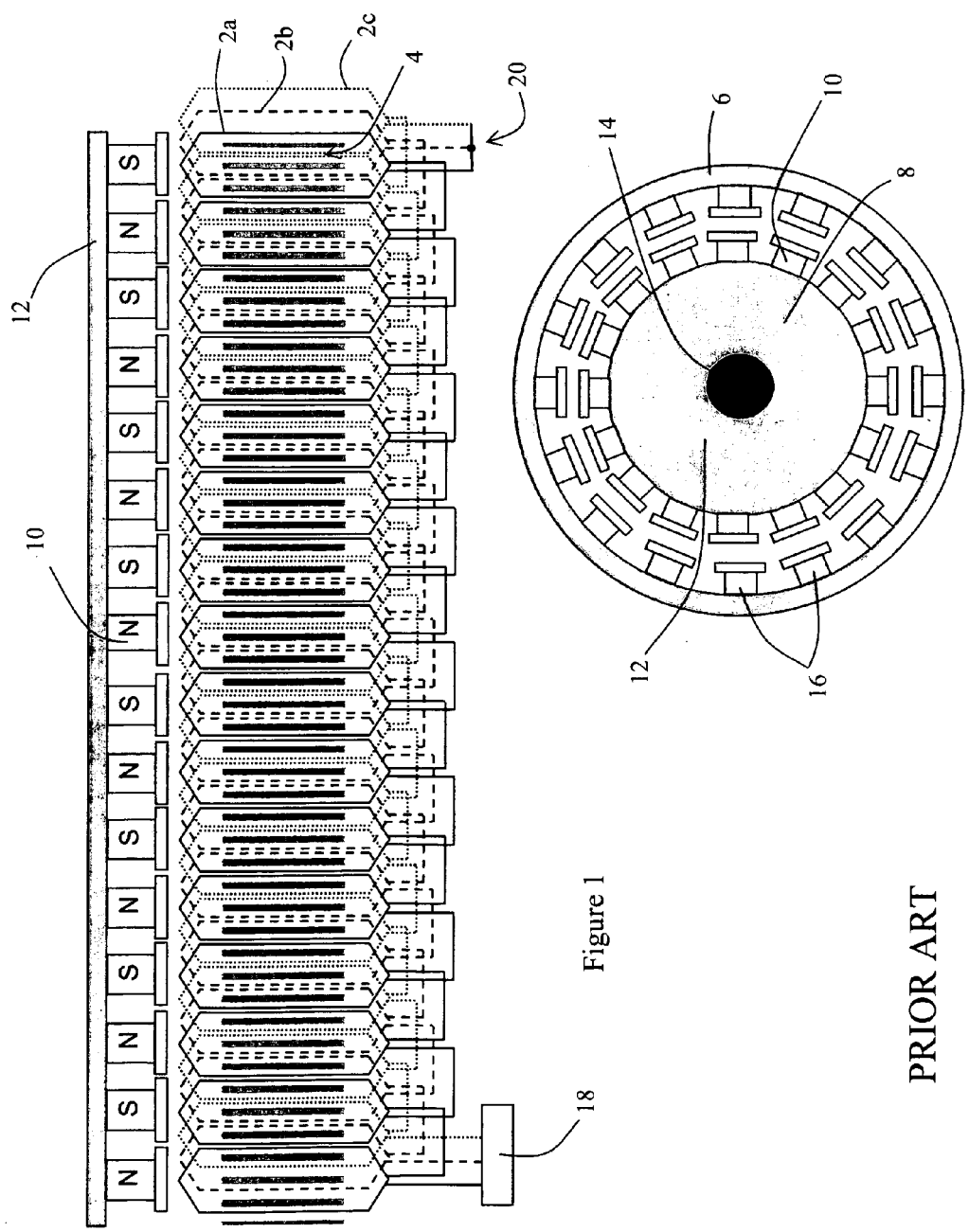
FIG. 1 is a schematic drawing showing a conventional stator winding for a permanent magnet electrical machine.

With reference to FIG. 1 a conventional three-phase stator winding includes three separate sub-windings 2a, 2b and 2c, the individual coils of which are represented by solid, dashed and dotted lines, respectively. Sub-winding 2a may carry phase A, sub-winding 2b may carry phase B, and sub-winding 2c may carry phase C of a three-phase ac voltage, for example. The coils are connected together in series to form each sub-winding 2a, 2b and 2c and are received in winding slots 4 that are formed in the radially inner surface of a stator 6. A rotor 8 is located radially inside the stator 6 and carries a plurality of permanent magnets 10 on its radially outer surface. The rotor includes a rotor support structure 12 and a shaft 14. The permanent magnets 10 define an alternating array of north (N) and south (S) poles as shown in the upper drawing of FIG. 1.

In the lower drawing of FIG. 1 the coils of the three-phase stator winding are represented schematically as an alternating array of north and south poles 16.

The separate sub-windings 2a, 2b, 2c of the three-phase stator winding are connected at one end to a three-phase ac power supply 18 and are joined in a star connection 20.

A first three-phase stator winding according to the present invention is shown in FIGS. 2 to 5. The other features of the electrical machine are as shown in FIG. 1.

The coils of the three-phase stator winding are divided into two coil groups that are labelled Group 1 and Group 2. More particularly, a first coil group (Group 1) shown in FIG. 2 consists of coils from the three sub-windings 22a, 22b and 22c, the individual coils of which are represented by solid, dashed and dotted lines, respectively. A second coil group (Group 2) shown in FIG. 3 consists of coils from the three sub-windings 24a, 24b and 24c, the individual coils of which are represented by solid, dashed and dotted lines, respectively.

Figure 2:
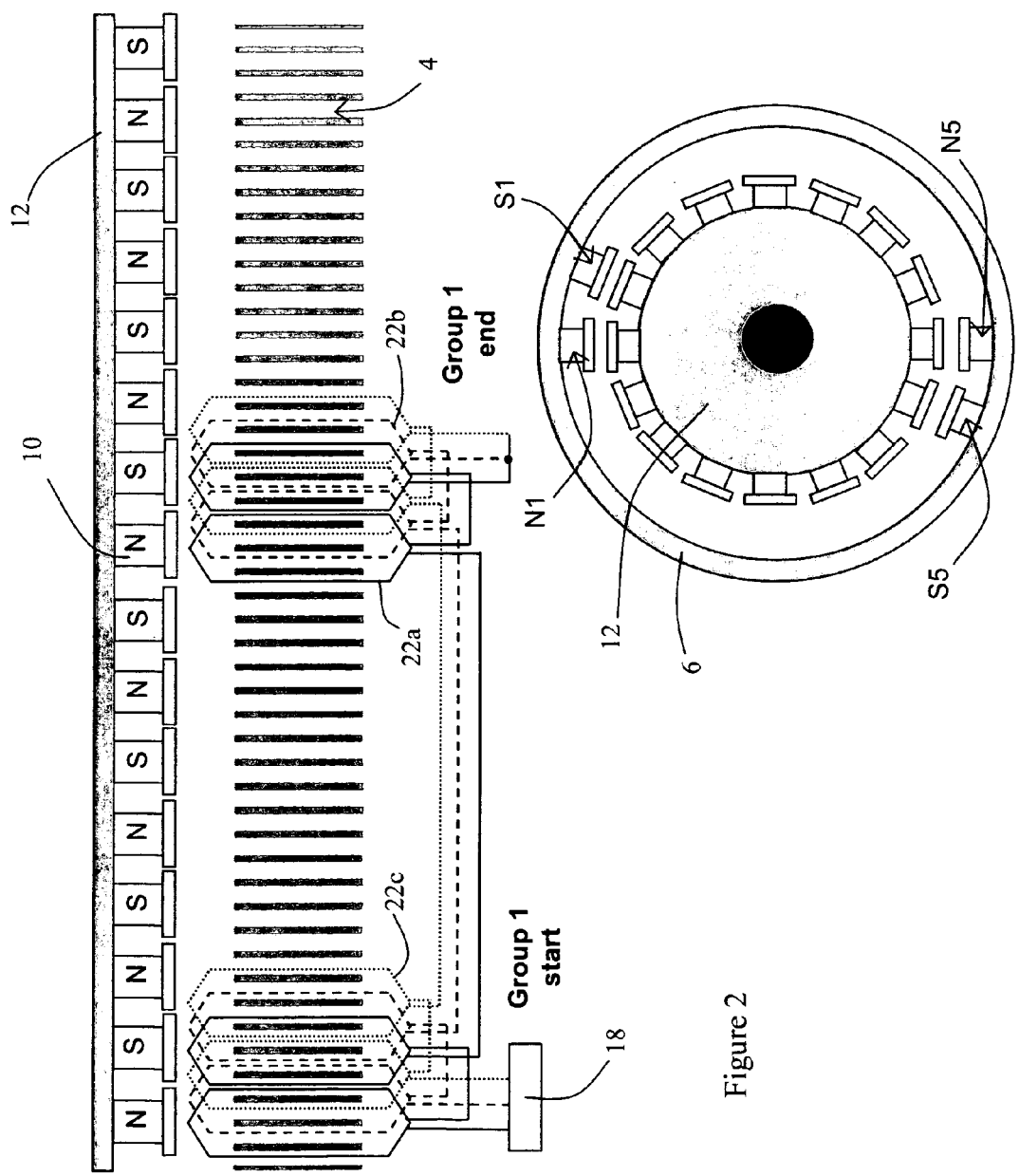
FIG. 2 is a schematic drawing showing a first part of a stator winding according to the present invention with two coil groups.

The first coil group (Group 1) contains four coils from each sub-winding 22a, 22b and 22c giving a total of twelve coils. As shown in FIG. 2 the coils are arranged in winding slots 4 formed in the stator 6 and together define a two pairs of north and south stator poles labelled N1, S1, N5 and S5 (i.e. a total of four stator poles). Each individual stator pole is defined by a set of three-phase coils, or more particularly by one coil from each sub-winding 22a, 22b and 22c. The coils are arranged in winding slots 4 in two discrete 'clumps' but are still symmetrical about the circumference of the stator 6 so as to provide a balanced rotating torque when the first coil group is active.

Figure 3:
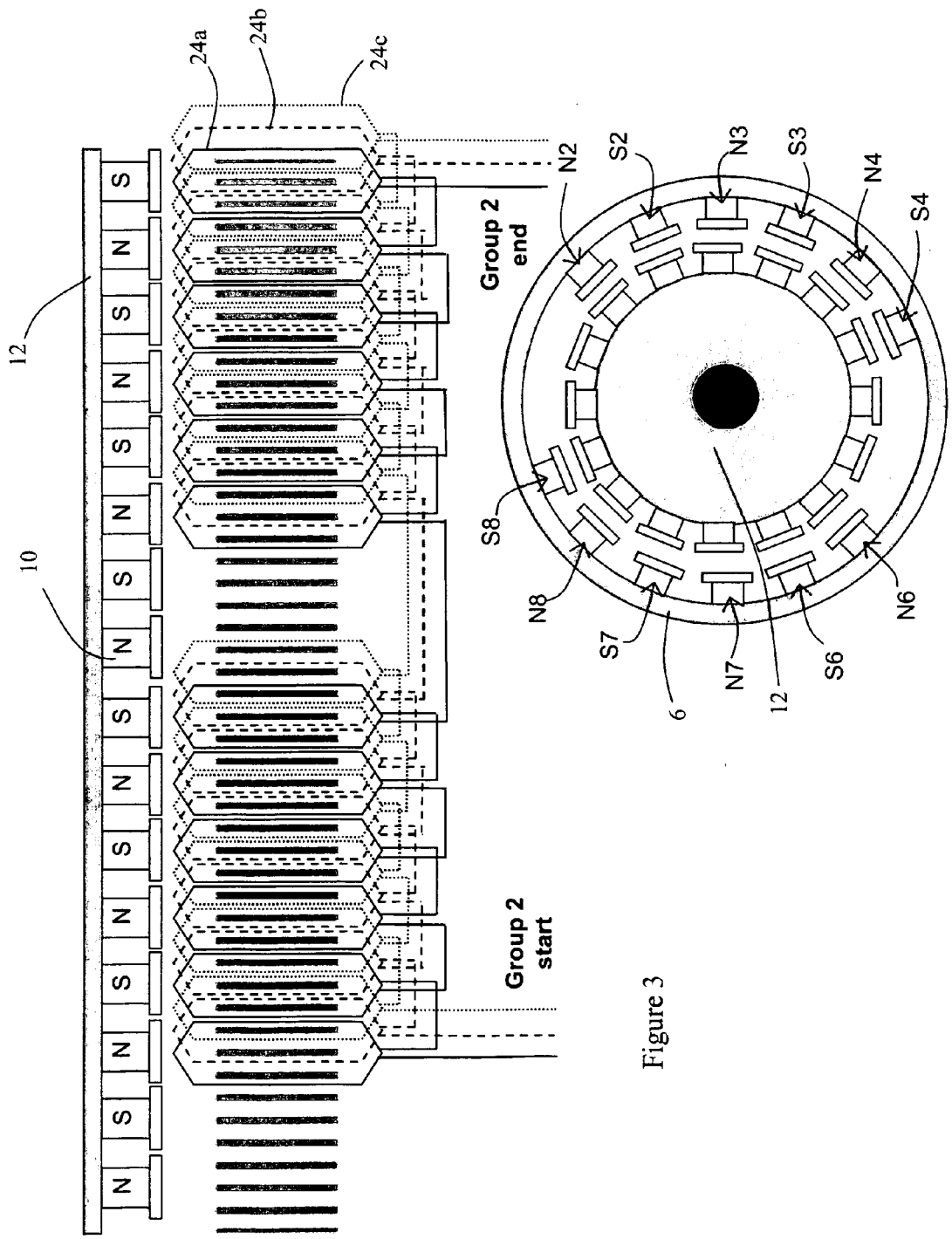
FIG. 3 is a schematic drawing showing a second part of a stator winding according to the present invention with two coil groups.

The second coil group (Group 2) contains twelve coils from each sub-winding 24a, 24b and 24c giving a total of thirty-six coils. As shown in FIG. 3 the coils are arranged in winding slots 4 formed in the stator and together define a six pairs of north and south stator poles labelled N2, S2 . . . S4 and N6, S6 . . . S8 (i.e. a total of twelve stator poles). Again, each individual stator pole is defined by a set of three-phase coils, or more particularly by one coil from each sub-winding 24a, 24b and 24c. The coils are arranged in winding slots 4 in discrete 'clumps' but are still symmetrical about the circumference of the stator 6 so as to provide a balanced rotating torque when the second coil group is active.

When connected together as described below, the separate sub-windings 22a, 22b and 22c and 24a, 24b and 24c form a single three-phase stator winding with a total of forty-eight coils defining eight pole pairs. Four of the stator poles N1, S1, N5 and S5 are defined by the coils of the first coil group and twelve of the stator poles N2, S2 . . . S4 and N6, S6 . . . S8 are defined by the coils of the second coil group.

The first coil group includes ¼ of the total number of coils and can provide approximately ¼ of the maximum torque of the electrical machine. The second coil group includes ¾ of the total number of coils and can provide approximately ¾ of the maximum torque of the electrical machine. However, it will be readily appreciated that each coil group can have any suitable proportion of the total number of coils giving a corresponding proportion of the maximum torque of the electrical machine.

Figure 4:
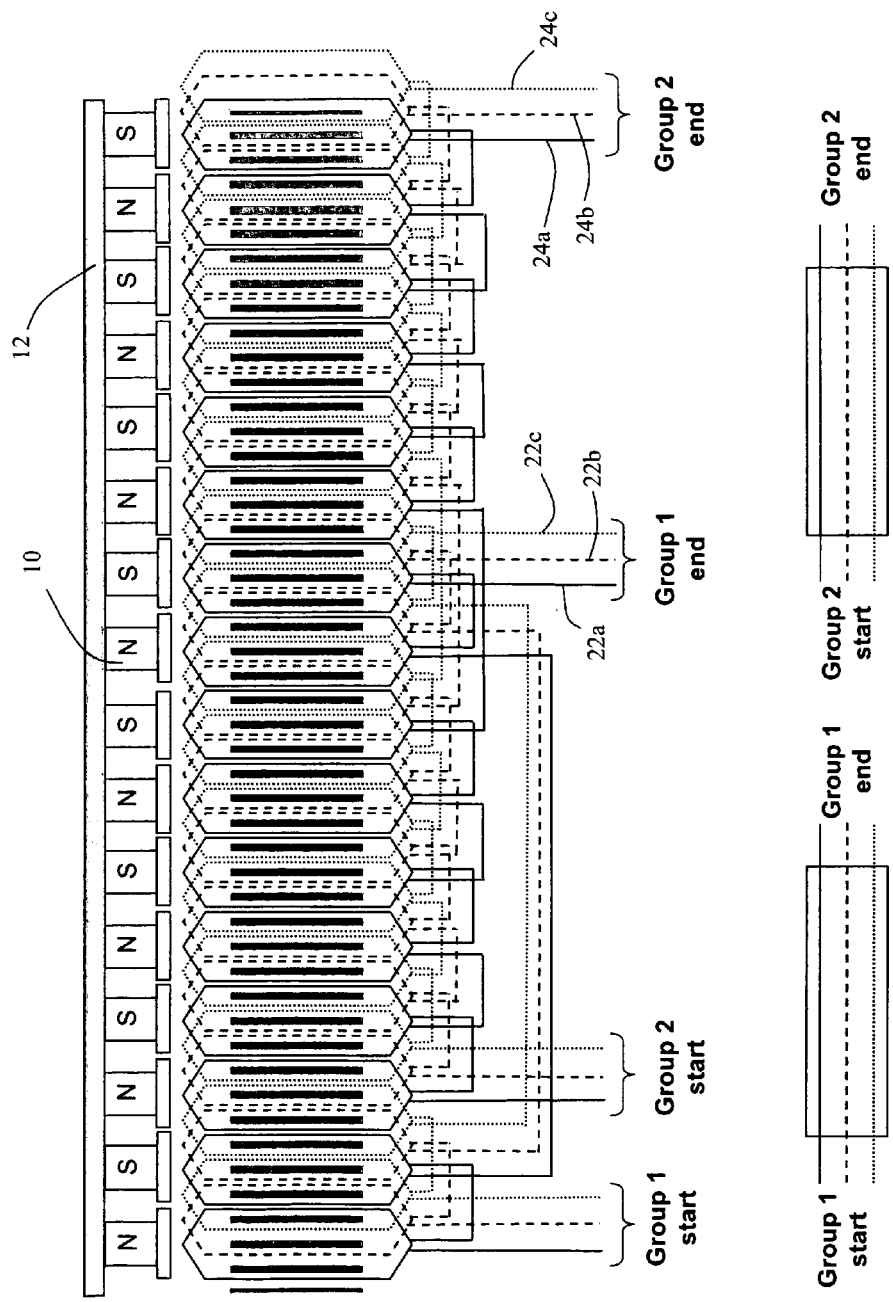
FIG. 4 is a schematic drawing showing a complete stator winding with two coil groups.

The first and second coil groups can be represented schematically as shown in FIG. 4.

FIG. 5A shows how the first and second coil groups as defined by the separate sub-windings 22a, 22b and 22c and 24a, 24b and 24c are connected together in series to form a single three-phase stator winding. More particularly, the end of Group 1 is connected to the start of Group 2 with each separate sub-winding 22a, 22b and 22c being connected to the corresponding sub-winding 24a, 24b and 24c carrying the same ac phase. In other words, sub-winding 22a carrying phase A is connected to sub-winding 24a carrying phase A, sub-winding 22b carrying phase B is connected to sub-winding 24b carrying phase B, and sub-winding 22c carrying phase C is connected to sub-winding 24c carrying phase C. This can also be understood with reference to FIG. 4 where the start and end of each coil group is clearly identified.

The ends of the sub-windings 24a, 24b and 24c that form Group 2 are connected together by a star end connection 28.

The start of Group 1 is connected to the three-phase power supply 18 by means of a first switch 26a The start of Group 2 is connected to the three-phase power supply 18 by means of a second switch 26b. It will therefore be readily appreciated that the start of each coil group is connected in parallel to the three-phase power supply 18.

FIG. 5B shows that a further switch 30 can be provided between the end of Group 1 and the start of Group 2 (i.e. in the series connection between the first and second coil groups). The introduction of the further switch 30 allows the coil groups to be divided and this avoids the need for extra higher voltage insulation.

Figure 6:
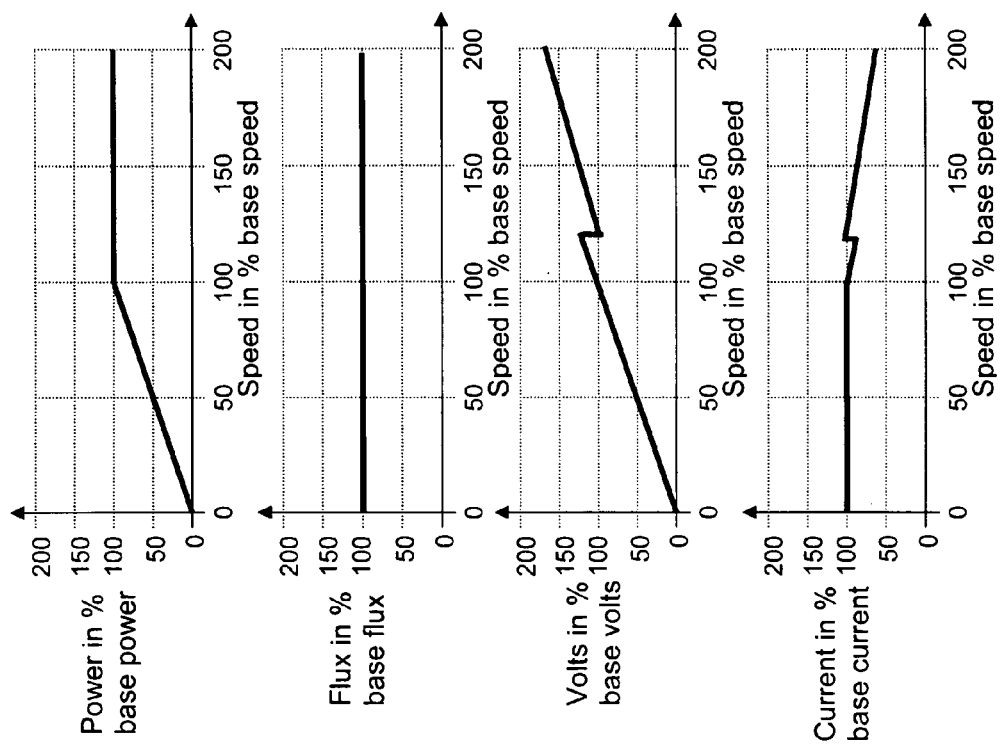
FIG. 6 shows the operational parameters of a permanent magnet electrical machine incorporating the stator winding of FIGS. 4 and 5.

FIG. 6 shows various operational parameters of a permanent magnet electrical machine incorporating the three-phase stator winding of FIGS. 2 to 5.

The top graph shows how the power changes with the operating speed of the electrical machine. It can be seen that the power increases linearly with an increase in the operating speed of the electrical machine until a 100% of base operating speed is reached. At this point, any further increase in operating speed does not result in an increase in power, which remains constant at 100% of base power.

The next graph shows that the flux in the electrical machine remains constant at 100% of base flux since the rotor pole flux is achieved using permanent magnets.

The next graph shows how the stator voltage changes with the operating speed of the electrical machine. At low operating speeds both of the switches 26a and 26b are closed such that both the first and second coil groups are active and the three-phase stator winding provides the maximum available torque. Voltage increases linearly with an increase in the operating speed of the electrical machine until a threshold of approximately 120% of base operating speed is reached. At this threshold switch 26a is opened to deactivate the first coil group (Group 1) while the switch 26b remains closed. The voltage is reduced instantaneously on opening the switch 26a and then increases linearly with an increase in the operating speed of the electrical machine. At operating speeds above the first threshold only the second coil group (Group 2) is active and the three-phase stator winding provides only approximately ¾ of the maximum available torque. It can therefore be seen that the torque provided by the three-phase stator winding can be reduced in a series of discrete steps with increasing operating speed. This results in an operation similar to field weakening and allows the electrical machine to operate over a wide speed range. The number of discrete steps that can be utilised by the three-phase stator winding will depend on the number of coil groups and the switching circuit.

The switches 26a and 26b (and switch 30) are operated by a controller 32. The control strategy by which the controller 32 opens and closes the switches to activate and deactivate the coil groups may be based on one or more speed thresholds or other operating parameters of the electrical machine such as voltage or current, for example.

Figure 7:
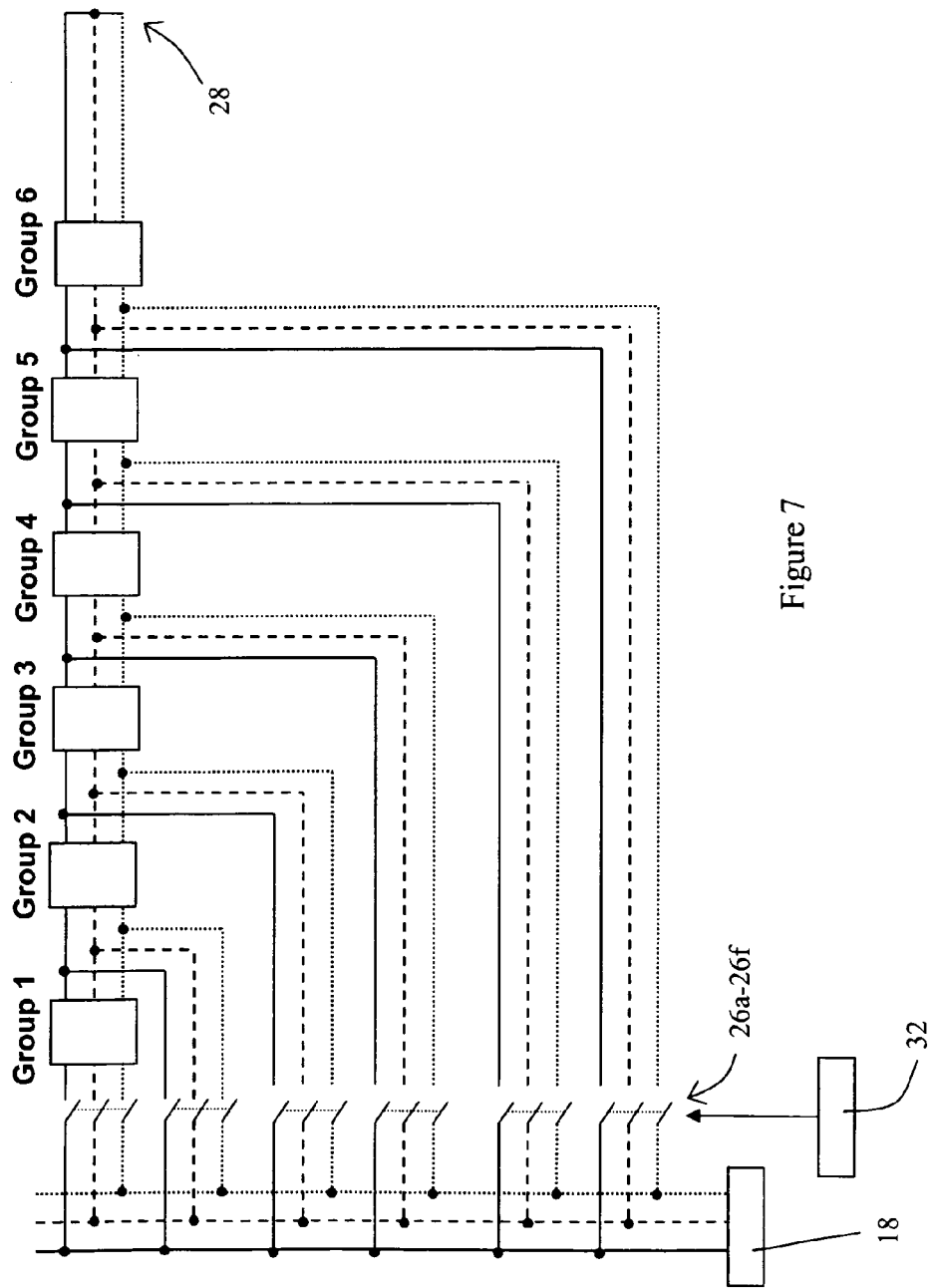
FIG. 7 is a schematic drawing showing a complete stator winding with six coil groups.

An alternative three-phase stator winding is shown in FIG. 7. In this case, the coils of the three-phase stator winding are divided into six coil groups that are labelled Group 1, Group 2 . . . Group 6. The coil groups can be configured to provide any desired proportion of the maximum torque of the electrical machine. For example, if each coil group contains the same number of coils then each could provide ⅙ of the maximum torque.

The coil groups are connected together in series to form the complete three-phase stator winding. More particularly, the end of Group 1 is connected to the start of Group 2, the end of Group 2 is connected to the start of Group 3, and so on.

The ends of the sub-windings that form Group 6 are connected together by a star end connection 28.

The start of each coil group is connected in parallel to the three-phase power supply 18 by means of a respective switch 26a-26f.

Figure 8:
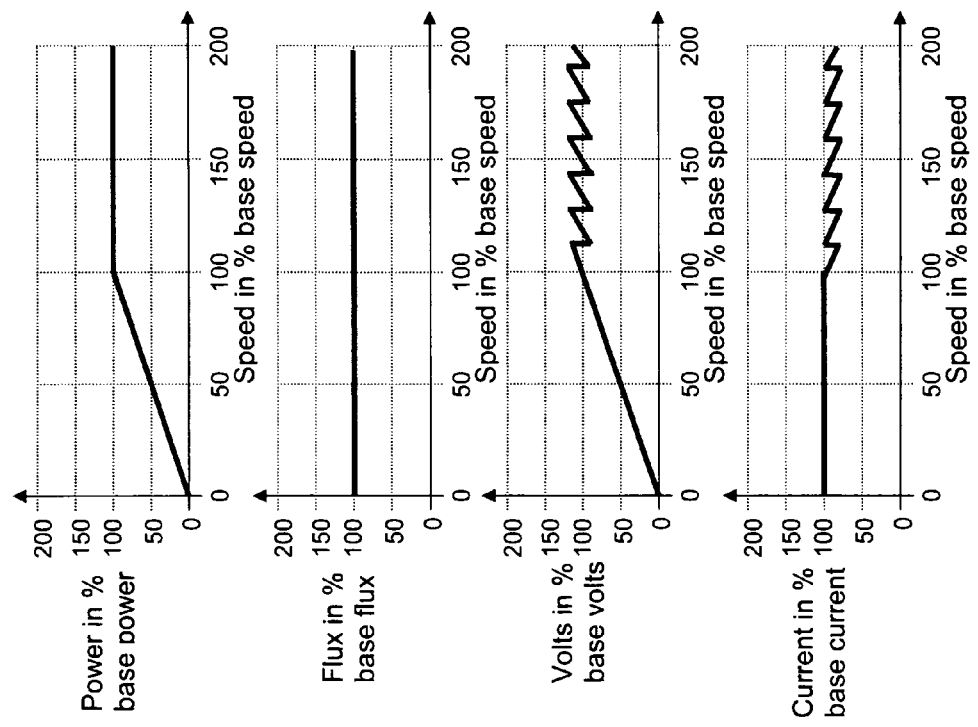
FIG. 8 shows the operational parameters of a permanent magnet electrical machine incorporating the stator winding of FIG. 7.

FIG. 8 shows various operational parameters of a permanent magnet electrical machine incorporating the three-phase stator winding of FIG. 7.

The top graph shows how the power changes with the operating speed of the electrical machine. It can be seen that the power increases linearly with an increase in the operating speed of the electrical machine until a 100% of base operating speed is reached. At this point, any further increase in operating speed does not result in an increase in power, which remains constant at 100% of base power.

The next graph shows that the flux in the electrical machine remains constant at 100% of base flux since the rotor pole flux is achieved using permanent magnets.

The next graph shows how the stator voltage changes with the operating speed of the electrical machine. At low operating speeds all of the switches 26a-26f are closed such that all six coil groups are active and the stator winding provides maximum available torque. Voltage increases linearly with an increase in the operating speed of the electrical machine until a first threshold of approximately 112% of base operating speed is reached. At this first threshold switch 26a is opened to deactivate Group 1. The voltage is reduced instantaneously on opening switch 26a and then increases linearly with an increase in the operating speed of the electrical machine until a second threshold of approximately 125% of the base operating speed is reached. At the second threshold the switch 26b is opened to deactivate Group 2. The voltage is reduced instantaneously on opening switch 26b and then increases linearly with an increase in the operating speed of the electrical machine until a third threshold of approximately 145% of the base operating speed is reached. The remaining switches 26c-26f are opened in turn as subsequent thresholds are reached to deactivate the respective coil group. The stator voltage therefore traces a 'saw tooth' pattern and remains substantially at 100% of the base voltage as the operating speed increases above 100% of the base operating speed.

As the switches 26a-26f are opened sequentially, the torque provided by the three-phase stator winding is reduced in a series of discrete steps with increasing operating speed in exactly the same way as for the stator winding shown in FIGS. 2 to 5.

With appropriate switching circuits, any combination of the six coil groups can be active.

An ac motor acceleration circuit is shown in FIG. 9. The coils of the three-phase stator winding are divided into two coil groups that are labelled Group 1 and Group 2. The first coil group includes ¾ of the total number of coils and the second coil group includes ¼ of the total number of coils. However, it will be readily appreciated that each coil group can have any suitable proportion of the total number of coils.

The start of Group 1 is connected to the three-phase power supply 18 by means of a first switch 26a.

The ends of the sub-windings that form Group 2 are connected together by a star end connection 28.

The start of Group 2 is connected to the three-phase power supply 18 by means of a second switch 26*b* and a power supply circuit consisting of an input transformer 34, a power converter (inverter) 36 and a third switch 38. It is also possible for the power supply circuit to be connected to a separate, dedicated, three-phase power supply by means of the second switch 26*b*. The power supply circuit does not need the output transformer that is a recognised feature of conventional acceleration circuits.

The ac motor acceleration circuit of FIG. 9 could be used to accelerate an ac motor to a rated stator voltage of 11,000 kV ac RMS using a power converter 36 that is rated at 3,000 kV ac RMS without the need for an output transformer.

FIG. 10 shows various operational parameters of the ac motor acceleration circuit of FIG. 9.

The top graph shows how the motor speed changes with time during an acceleration stage. It can be seen that the speed increases linearly until the rated speed is reached.

The next graph shows that the stator voltage of the motor also increases linearly until the rated stator voltage is reached.

The next graph shows how the inverter voltage changes during the acceleration stage. It can be seen from the bottom two graphs that the first switch 26*a* is initially open so Group 1 is deactivated. The second switch 26*b* and the third switch 38 are initially closed and ac power is provided to Group 2 from the power converter 36. More particularly, power is supplied to the power converter 36 from the three-phase power supply 18 (or from a dedicated power supply) through the input transformer 34. The power is then conditioned by the power converter 36 and supplied to the second coil group.

It can be seen that when the motor speed has reached the rated speed then the inverter voltage is approximately 25% of the rated stator voltage because the second coil group contains ¼ of the total number of coils. The proportion of the rated stator voltage will depend on the distribution of coils between the coil groups. For example, if the first coil group includes ½ of the total number of coils and the second coil group includes ½ of the total number of coils then the inverter voltage would be approximately 50% of the rated stator voltage. In this case the ac motor acceleration circuit could be used to accelerate an ac motor to a rated stator voltage of 11,000 kV ac RMS using a power converter 36 that is rated at 6,600 kV ac RMS without the need for an output transformer.

Once the motor speed has reached the rated speed then the third switch 38 can be opened to disconnect Group 2 from the power converter 36. The inverter voltage therefore reduces to zero. The first switch 26*a* is closed to connect Groups 1 and 2 to the power supply 18. The operation of the switches can be carried out at any time once the rated speed has been reached and causes the motor torque to increase in the usual way until it reaches the motor rated torque. Before the stator winding is connected directly to the power supply 18, the stator voltage may need to be controlled by the power converter 36 to be in alignment with the ac supply voltage.

What is claimed is:

1. An electrical machine comprising:
    a multi-phase stator (i) including two or more coil groups and (ii) formed of sub-windings, each sub-winding corresponding to one of the phases;
    wherein each sub-winding includes a plurality of coils, each coil being (i) part of a multi-phase set, each set being representative of only one of the poles and (ii) associated with one of the coil groups; and
    wherein each coil group (i) includes a proportion of a total number of coils within the stator and (ii) is configured for coupling to a power source, an end of one of the two or more coil groups being connected to a beginning of the other coil group (ii) and producing a respective proportion of a maximum torque of the electrical machine.

2. The electrical machine of claim 1, further comprising a controller for controlling an activation of the two or more coil groups via a control signal.

3. The electrical machine of claim 2, further comprising two or more switches configured for connecting to a start of each of the two or more coil groups.

4. The electric machine of claim 3, wherein each of the two or more switches is configured to receive the control signal as an input.

5. The electric machine of claim 4, wherein each coil group is connected to a separate power source/sink.

6. The electric machine of claim 1, wherein the sub-windings are connected to each other via a star or delta connection.

7. The electrical machine of claim 1, further comprising a rotor carrying a plurality of permanent magnets.

8. The electrical machine of claim 1, wherein the stator includes a stator winding; and
    wherein the first and second coil groups are connected in series, the first coil group being connected to a power source by means of a first switch and the second coil group being connected to another power source by means of a second switch and a power converter.

9. The electrical machine according to claim 1, further comprising two or more switches respectively coupled to a start of the two or more coil groups.

10. The electrical machine according to claim 9, wherein responsive to a control signal, (i) each of the two or more coil groups is configured for activation via one of the switches to provide the respective proportion of the maximum torque and (ii) one of the coil groups being configured for deactivation when a speed of the electrical machine satisfies a first speed threshold.

11. The electrical machine according to claim 10, wherein the active coil group of the two or more coil groups is configured for increasing the speed of the electrical machine beyond the first speed threshold to satisfy a second speed threshold.

* * * * *